US007399957B2

(12) United States Patent
Parker et al.

(10) Patent No.: US 7,399,957 B2
(45) Date of Patent: Jul. 15, 2008

(54) CODED MASS SPECTROSCOPY METHODS, DEVICES, SYSTEMS AND COMPUTER PROGRAM PRODUCTS

(75) Inventors: Charles B. Parker, Mebane, NC (US); David J. Brady, Durham, NC (US); Jeffrey T. Glass, Durham, NC (US); Michael E. Gehm, Durham, NC (US)

(73) Assignee: Duke University, Durham, NC (US)

( * ) Notice: Subject to any disclaimer, the term of this patent is extended or adjusted under 35 U.S.C. 154(b) by 51 days.

(21) Appl. No.: 11/332,303

(22) Filed: Jan. 17, 2006

(65) Prior Publication Data

US 2007/0080290 A1 Apr. 12, 2007

Related U.S. Application Data

(60) Provisional application No. 60/644,356, filed on Jan. 14, 2005.

(51) Int. Cl.
*B01D 59/44* (2006.01)

(52) U.S. Cl. ........................ 250/281; 250/282; 250/284; 250/286; 250/287; 250/299; 250/300

(58) Field of Classification Search .......... 250/281–300
See application file for complete search history.

(56) References Cited

U.S. PATENT DOCUMENTS

| | | | | |
|---|---|---|---|---|
| 4,978,852 | A * | 12/1990 | Williams et al. | 250/282 |
| 5,103,083 | A * | 4/1992 | Reed et al. | 250/214 VT |
| 5,396,065 | A * | 3/1995 | Myerholtz et al. | 250/287 |
| 5,545,895 | A * | 8/1996 | Wright et al. | 250/282 |
| 5,710,713 | A * | 1/1998 | Wright et al. | 702/23 |
| 6,323,482 | B1 * | 11/2001 | Clemmer et al. | 250/287 |
| 6,960,761 | B2 * | 11/2005 | Clemmer | 250/287 |
| 2002/0014586 | A1 * | 2/2002 | Clemmer | 250/287 |
| 2004/0094702 | A1 * | 5/2004 | Clemmer | 250/283 |
| 2005/0120778 | A1 * | 6/2005 | Von Herzen et al. | 73/61.41 |

* cited by examiner

*Primary Examiner*—Jack I. Berman
*Assistant Examiner*—Andrew Smyth
(74) *Attorney, Agent, or Firm*—Kasha Law PLLC; John R. Kasha

(57) ABSTRACT

A coded mass spectrometer incorporates a spatial or temporal code to reduce the resolution/sensitivity dichotomy inherent in mass spectrometry. The code is used to code one or more portions of a mass spectrometer. Coding patterns, such as Hadamard codes, Walsh codes, and perfect code sequences can be used. The coding can be spatial, for example, by using an aperture mask and/or temporal, for example, by coded injection of ions for analysis.

20 Claims, 14 Drawing Sheets

1200

1300

CODED MASS SPECTROSCOPY METHODS, DEVICES, SYSTEMS AND COMPUTER PROGRAM PRODUCTS

This application claims the benefit of U.S. Provisional Appln. No. 60/644,356, filed Jan. 14, 2005, which is hereby incorporated by reference in its entirety.

BACKGROUND OF THE INVENTION

1. Field of the Invention

Embodiments of the present invention relate to mass spectrometry. More particularly embodiments of the present invention relate to using coded mass spectrometers to reduce the inherent trade off of resolution and sensitivity.

2. Background Information

Mass spectrometers generally operate by ionizing a sample, such as a gas analyte. The ionized sample is generally filtered and the ions are transported by electromotive forces toward a mass detector. The detector detects the ions according to their mass-to-charge ratio through a variety of methods. Thus, the functional elements of a mass spectrometer generally include ionization, mass separation, and ion detection.

FIG. 1 is a schematic diagram of an exemplary conventional mass spectrometer 100. A gas analyte sample 102 is introduced to an ionization chamber 104 between an emitter 106 and an extraction grid 108. Ions are created through an ionization process in ionization chamber 104. During the ionization process an electron may be removed from or added to gas analyte molecules. A portion of the molecules introduced into the ionization chamber are ionized. These ions have a distribution of velocities and directions, and are electromagnetically pulled through extraction grid 108 by operation of negatively biased emitter 106 and a positively charge focus grid 110. A portion of these ions then pass through negatively biased acceleration grids 112. Enough energy is added by acceleration grids 112 that the ions that exit the grid are collimated, as well as relatively homogeneous in momentum and direction. These ions are then filtered through a slit to ensure that the remaining ions have originated from a single line in space. The width of the slit, among other parameters, determines the resolution and sensitivity of the spectrometer. The thinner the slit, the better the resolution but the poorer the sensitivity.

As the ions move through the magnetic field, they are deflected based upon their mass/charge ratio. Higher masses yield a lower deflection for a given charge. the ions strike a position sensitive detector 114. Detector 114 accumalates ion strike positions. This is read out as a function of position, resulting in a mass spectrum. An exemplary mass spectrum 200 is illustrated graphically in FIG. 2.

SUMMARY OF THE INVENTION

According to embodiments of the invention, devices, methods and computer program products are provided that incorporate coded spectroscopy in a mass spectrometer. In some embodiments, an encoded pattern, such as a Walsh or Hadamard coding pattern or perfect coding sequence, is used to spatially encode portions of a mass spectrometer, e.g., by using a Walsh or Hadamard encoded mask. In some embodiments, an encoded pattern is used to temporally encode a portion of a mass spectrometer, for example, by pulsing various elements of the mass spectrometer according to the code. For example, electromagnetic fields used as part of the spectrometer may be pulsed on and off according to the encoded pattern. Detectors in the mass spectrometer may be encoded based on a spatial pattern (such as a mask) or based on a temporal pattern (such as by detecting particles during intervals based on the coding pattern).

Embodiments of the present invention include computer program products and/or hardware configured to implement a coded pattern in a conventional mass spectrometer, e.g., by controlling a temporal pattern, such as a pulsed electromagnetic field. Further embodiments of the present invention include mass spectrometers and other devices for introducing coding patterns, such as with a masking pattern, a coded aperture array, a coded detector array, a coded focusing grid, and the like. Coded electromagnetic fields and coded detectors may also be used.

Coded apertures may be used for the separation, analysis, sensing and/or identification of charged particles and particles with mass. This includes the coded apertures themselves, the algorithms required to design the coding and to extract the desired information from the data generated using the coding, and the apparatus to take advantage of the coded apertures. The embedded code and corresponding physical instruments may be used in systems that analyze particles that are charged or have mass, in contrast to systems where coded apertures have been used to analyze particles without charge or mass, typically high energy photons. Many kinds of atomic, molecular and ionic spectrometry can utilize embedded codes to improve signal to noise ratio, enhance resolution, and be physically simplified. Although embodiments of the present invention are described with respect to mass spectrometry, it should be understood that any type of spectrometry using particles with mass and/or charge, such as electrons, atoms, molecules, etc. is considered within the scope of the invention. Examples of application for encoded spectroscopy include the focusing of neutral oxygen molecules for particle beam profiling and as a spatial and/or velocity filter of neutral polar molecules for focusing and "cooling" of a molecular beam, or as a novel deposition method of molecules in Molecular Beam Epitaxy (MBE). In addition, embodiments of the invention include both coded aperture imaging of these particles as well as coded aperture spectroscopy of such particles.

A mass spectrometer according to an embodiment of the present invention can provide:

1. application of aperture coding to charged particles or particles with mass;
2. application of a temporal code rather than a spatial code;
3. application of aperture coding to mass spectrometry, including magnetic sector mass spectrometry and time-of-flight (TOF) mass spectrometry;
4. A larger sampling volume for the source particles to be used, and as a result, the coded aperture can enable an array of slits, rather than the single slit used currently, without degrading resolution;
5. coded grids may be modified dynamically between spectra or during collection, so that a particular component of the spectrum may be emphasized or deemphasized by passing or blocking particular particles (i.e., ions with a particular mass/charge ratio in the case of classical mass spectrometry).
6. Combinations and subcombinations of 1-5 above.

Using embodiments of the invention, it may be possible to dramatically increase output by reducing the number of particles lost in transit to the detector. As a result, a coded mass spectrometer according to an embodiment of the present invention is likely to: (a) decrease the time to acquire a spectrum, thereby reducing the power consumption, (b) increase the signal to noise ratio thereby enablg detection of peaks previously too diffuse to detect, and/or (3) enable other features not possible currently, such as isotope detection. The signal to noise ratio may also be increased because of the increased number of particles. The resolution of particles (mass/charge ratios in the case of mass spectrometry) may also be increased because of an increase in signal to noise. The coded apertures can allow the physical simplification of the measurement apparatus.

Figure 1:
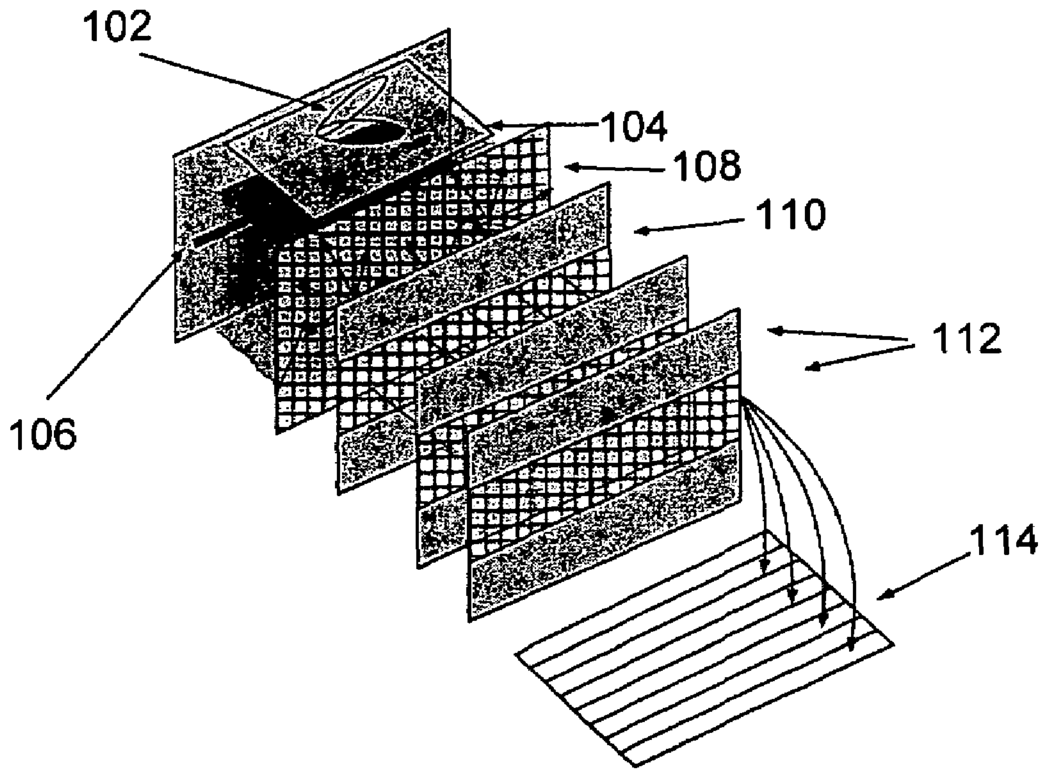
FIG. 1 is a schematic diagram of an exemplary conventional mass spectrometer.
Figure 2:
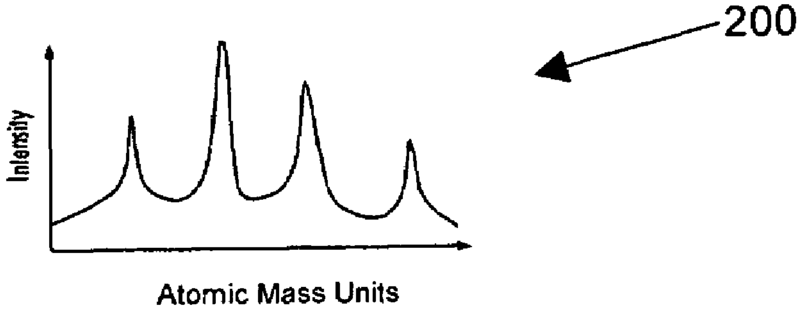
FIG. 2 is a graphical illustration of an exemplary mass spectrum generated by the conventional mass spectrometer of FIG. 1.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

A sensor can be understood fundamentally as an apparatus for converting a physical input state into a sensor state, coupled with a technique for converting that measurement into an estimate of the original input state. A sensor's measurement can be represented mathematically as $\vec{g} = \overleftrightarrow{G}\vec{s} + \vec{n}$, where $\vec{s}$ is the input state, $\overleftrightarrow{G}$ is the transformation matrix for the sensor, $\vec{n}$ represents additive noise, and $\vec{g}$ is the resulting sensor state. Estimation of the input state based on the sensor's output is then $\vec{s}_{est} = \overleftrightarrow{H}\vec{m}$, where $\overleftrightarrow{H}$ is the transformation matrix that represents the estimation process and $\vec{s}_{est}$ is the resulting estimate of the input state. The simplest estimation uses $\overleftrightarrow{H} = \overleftrightarrow{G}^{-}$.

In conventional mass-spectroscopy, the sensor state $\vec{g}$ corresponds to a detector output. For example, the sensor state $\vec{g}$ may correspond to either a charge density in specific spatial locations (i.e., ions detected in the position sensitive detector) for magnetic sector mass-spectroscopy, or charge arrival in a specific time period for time-of-flight mass-spectroscopy. Further, the transformation matrix $\overleftrightarrow{H}$ can be diagonal or nearly diagonal. This results in the well-known tradeoff between resolution and sensitivity described above.

By contrast, according to embodiments of the invention, if the instrument can be engineered such that the transformation matrix $\overleftrightarrow{H}$ has significant off-diagonal elements, then the resolution/sensitivity dichotomy can be reduced. A sensor with an off-diagonal transformation matrix is referred to as a multiplex sensor.

A multiplex mass-spectrometer according to embodiments of the invention may reduce the resolution/sensitivity dichotomy. That is, as described above, a multiplex sensor may reduce or avoid the trade-off between resolution and sensitivity that is characteristic of conventional mass spectrometers. Further, in a multiplex mass-spectrometer according to embodiments of the invention, the state estimate can be less sensitive to additive noise processes because a multiplex approach can distribute the error more evenly across the system. The result may be reduced noise contribution to the final state estimate. A multiplex mass-spectrometer according to embodiments of the invention may also result in faster measurements. Because the resolution/sensitivity tradeoff no longer holds, the device can be engineered to collect a greater sample. It therefore may achieve a given signal-to-noise ratio in a shorter time than a conventional mass spectrometer. A multiplex transformation matrix according to embodiments of the invention may also allow for the possibility of a compressive device where the number of elements in the state reconstruction is greater than the number of elements in the sensor state. This can result in instruments that are smaller and cheaper than traditional instruments.

Figure 3:
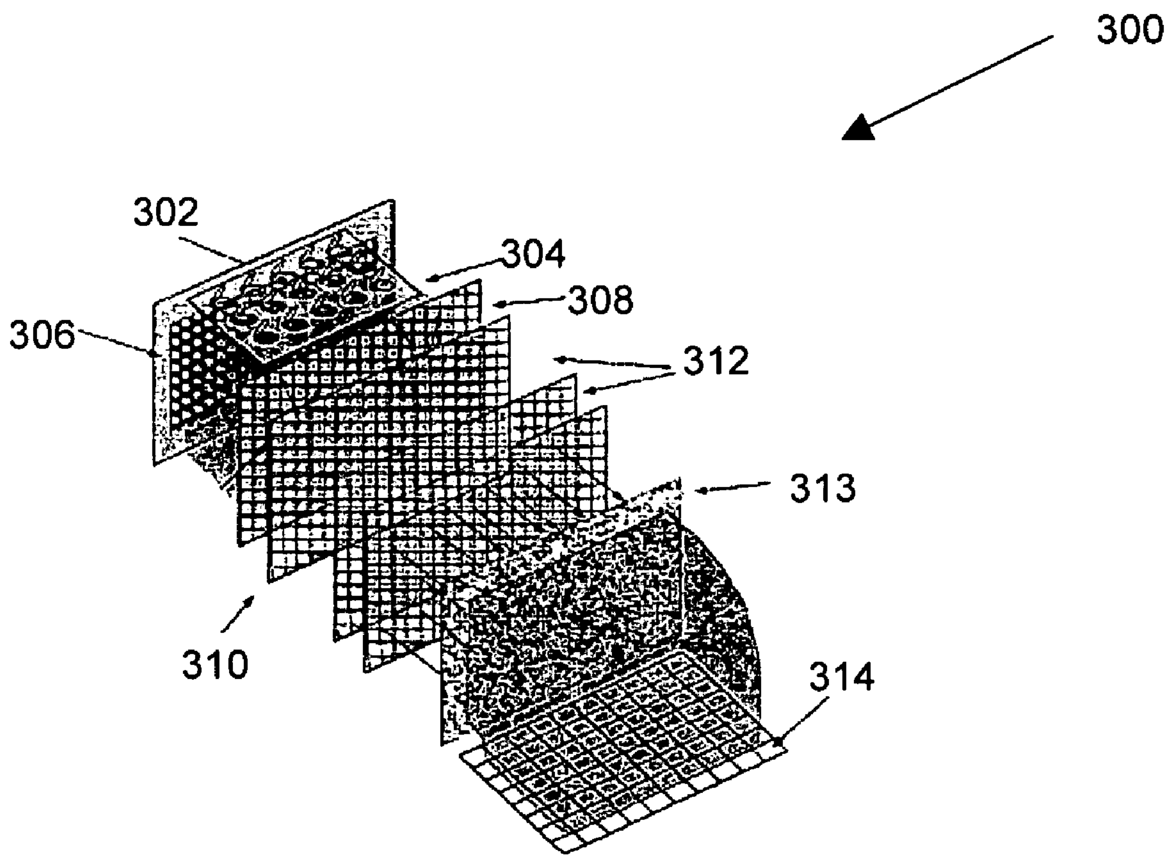
FIG. 3 is a schematic diagram of a coded mass spectrometer according to an embodiment of the present invention.

Any component of a mass spectrometer that contributes to the form of the transformation matrix $\overleftrightarrow{H}$ can be incorporated into a coding scheme according to embodiments of the present invention. FIG. 3 is a schematic diagram of a coded mass spectrometer 300 according to an embodiment of the present invention. Examples of the components of mass spectrometer 300 where coding may be useful are illustrated in FIG. 3 and are listed below. For the purpose of brevity, these various coding elements are shown in the exemplary mass spectrometer of FIG. 3; however, it should be understood that one or more of the coding elements may be used in various combinations. In some embodiments, a single coding scheme is selected based on the needs of a particular application.

Coding may be introduced upon introduction of an analyte 302. The sample to be analyzed may be introduced in a spatial and/or temporal coded pattern that interacts with another coded component or it may itself act as a dispersive element, e.g., through the relative effusion rates of the ions.

Coding may be introduced by an emitter 306. The emitters serve to ionize the analyte, in this case a gas, in an ionization chamber 304 so that the ionized molecules can be influenced by the electromagnetic fields, which act to separate the ions according to mass. The emitter is the cathode of the emitter/extraction pair. The emitter may be coded to yield a smaller variation in ion momentum and direction, especially when used in conjunction with another coded grid, such as the extraction grid. Alternatively, it may simply be much larger than is possible in an uncoded system.

Coding may be introduced by an extraction grid 308. Extraction grid 308 forms another part of the ionization chamber and acts as the anode. It provides a uniform field for the creation and extraction of the ions. This grid may be patterned spatially and/or pulsed temporally in a coded manner and interact with any of the other grids.

Coding may be introduced by a focusing grid 310. As the ions exit extraction grid 308, they have a wide variation of momentum and direction. Focusing grid 310 acts as an aperture, selecting a subset of the extracted ions based on direction. A coded focusing grid would allow a larger fraction of the extracted ions to be passed to the acceleration grids.

Coding may be introduced by a longitudinal acceleration grid 312. As ions exit the focusing grid, they have a small distribution of directions, but still a large distribution of energy. The acceleration grids add energy to the ions and homogenize their energy. The coding may be embedded in this acceleration grid, or if the coding is accomplished in other parts of the system, the grid may be designed to allow many more ions to pass to the slit/coded aperture than is possible in an uncoded system.

Coding may be introduced by a transverse acceleration grid 311. A transverse acceleration grid adds transverse kinetic energy to the ions just prior to their entrance into the analysis region. At its simplest, this grid focuses the ion trajectories, improving the performance of other coding elements. Alternatively, the grid could code the orientation of the input velocity vectors.

Coding may be introduced by an aperture 313. In a typical system, there is a slit that allows the starting position of the ions, in the magnetic sector to be known precisely. This may be replaced with a coded aperture that allows ions to pass in a way that can be decoded later, and which may be at an electric potential other than ground.

Coding may be introduced by a detector 314. The detection of the ions can also be encoded. A position sensitive detector enables x and y position to be determined and thus allows information on the particle position that can be computationally decoded. Similarly, a physical code can be embedded in this detector if desired and can be based on encoding elsewhere in the system.

Exemplary Applications of Coding to Mass-spectrometer Design

Embodiments of coded mass spectrometers according to the present invention are described below with respect to the following non-limiting examples.

Aperture-coded Magnetic Sector Mass Spectrometer

Figure 4:
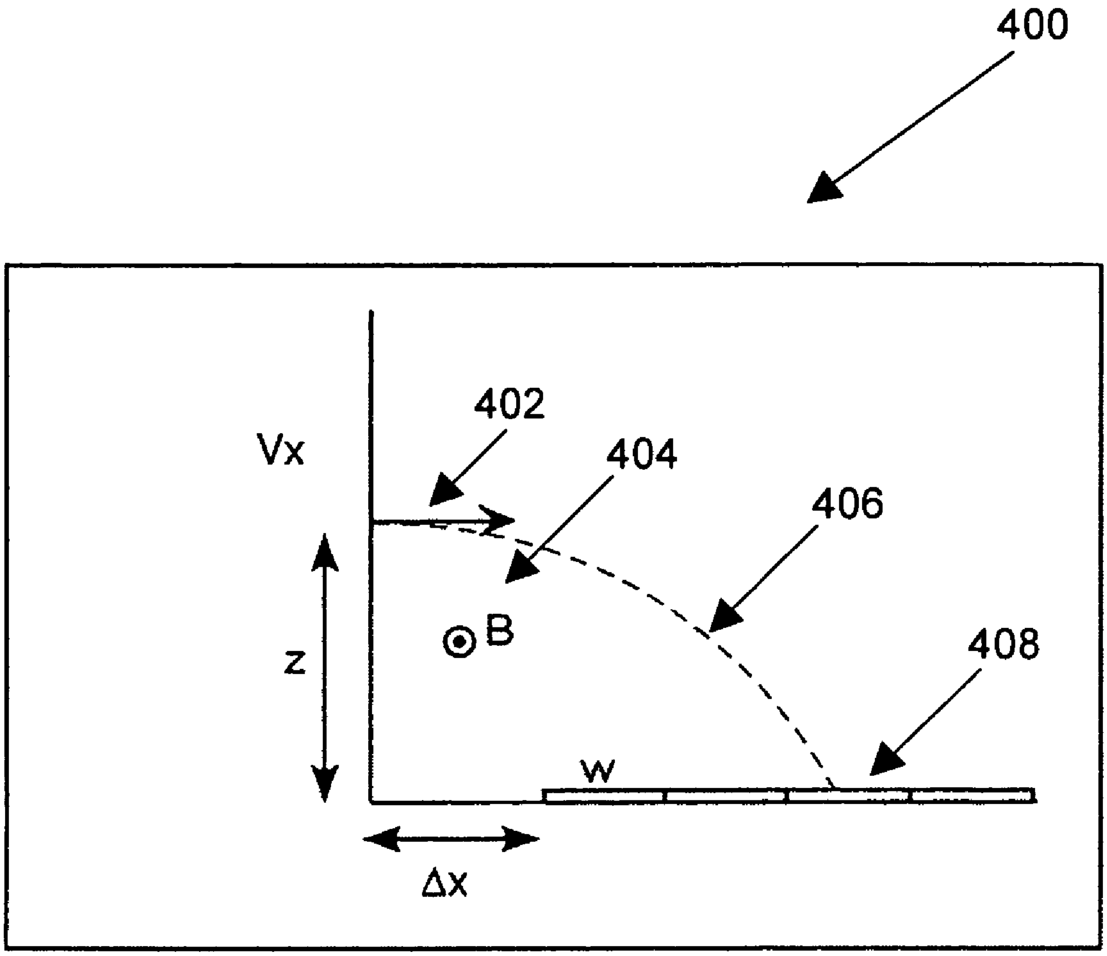
FIG. 4 is a graphical illustration of the analysis region of an aperture coded magnetic sector mass spectrometer according to an embodiment of the present invention.

In magnetic-sector mass-spectroscopy the ions are introduced into an analysis region containing a transverse magnetic field. FIG. 4 is a graphical illustration of the analysis region of an aperture coded magnetic sector mass spectrometer according to an embodiment of the present invention. Ions 402 entering analysis region 400 experience a Lorentz force from a magnetic field 404 and travel along a circular trajectory 406. Eventually, the ions impact a detector 408, and their charge contributes to the signal.

Ions enter the analysis region a height z above the plane containing the detector and has been accelerated by a potential in the x-direction of $V_x$. The detector starts at longitudinal position Ax and has position sensitive resolution of width w at location i. The magnetic field is transverse to the ion motion and has magnitude B. For this arrangement, the signal contribution of an ion entering at height z to the $i^{th}$ detector location is:

$$g_i(z) = \int_{\Delta x+(i-1)w}^{\Delta x+iw} dx \int dm S(m)\delta\left(m - \left(\frac{qB^2}{8V_x}\right)\left(\frac{(x^2+z^2)^2}{z^2}\right)\right)$$

The overall signal of the $i^{th}$ detector location is then the integral of this term taken over all possible starting heights for the ion $$g_i \propto = \int dz T(z) \int_{\Delta x+(i-1)w}^{\Delta x+iw} dx \int dm S(m)\delta\left(m - \left(\frac{qB^2}{8V_x}\right)\left(\frac{(x^2+z^2)^2}{z^2}\right)\right)$$

Here T describes the transmission function on the input aperture. A traditional instrument uses a slit aperture, so $T(z)=\delta(z-z_s)$, which collapses the first integral and makes the system description very simple, although at the potential expense of throughput.

An alternative embodiment of the invention is to code the aperture with some more complicated T. Exemplary codes include a code based on perfect sequences or a code based on a Hadamard code. An exemplary simulation of a Hadamard coded system is presented herein. A Hadamard matrix is any n×n matrix with elements in $\{-1,1\}$ with a maximal determinant. No constructive procedure for all Hadamard matrices is known, although it is conjectured that they exist for all n that are multiples of 4. There are constructive methods for subsets of the Hadamard matrices, the most common being the Sylvester and Paley constructions. Numerous Hadamard matrices of the sizes of interest for this application are known and have been tabulated in the literature. Walsh functions are related to the Hadamard matrices of order $n=2^m$. When the rows and columns of the Hadamard matrix are placed in sequency order (in sequential order based on number of transitions), the rows of the Hadamard matrix are the Walsh codes of size n. A perfect sequence of length n is a sequence of numbers for which the autocorrelation is zero except at values where $\text{mod}_n(x)=0$.

Figure 5:
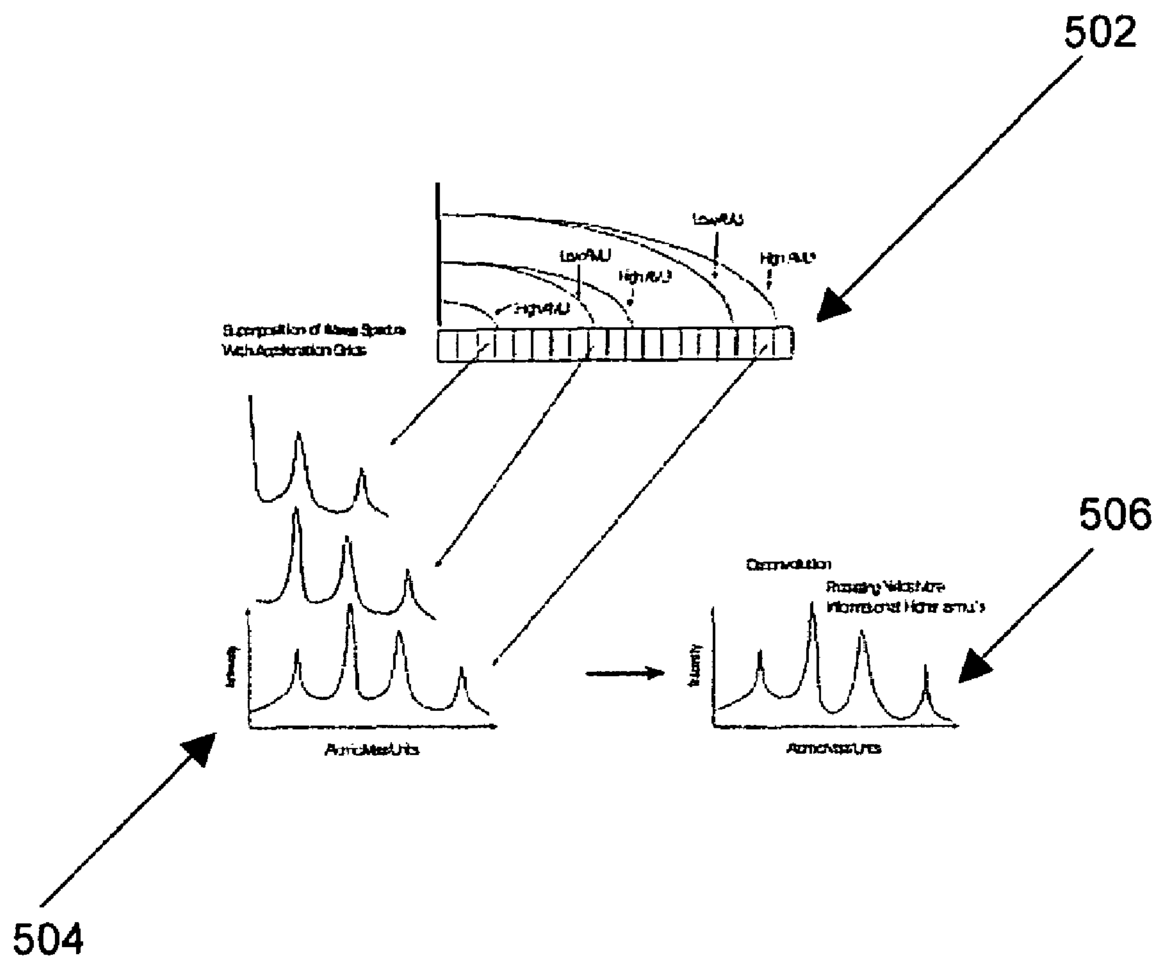
FIG. 5 illustrates an exemplary implementation of a multiplexed mass filter according to an embodiment of the present invention.

FIG. 5 illustrates an exemplary implementation of a multiplexed mass filter. A one-dimensional position sensitive detector 502 captures ions from the coded detector, effectively sampling a series of spectra 504 that are displaced according to the ion position on the aperture. The signal is then deconvolved into a single spectrum 506.

Injection-time-coded Time-of-flight Mass Spectrometer

Figure 6:
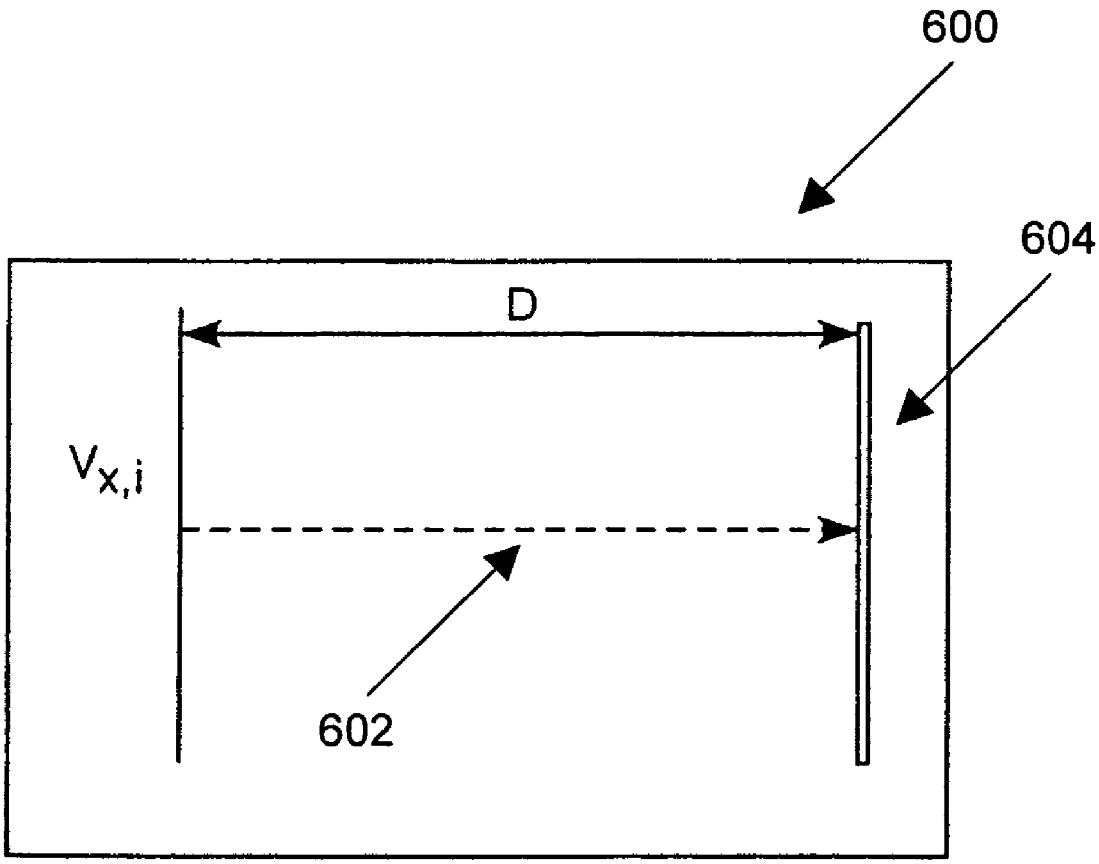
FIG. 6 is a schematic diagram of an analysis region of a time-or-flight mass spectrometer according to an embodiment of the present invention.

FIG. 6 is a schematic diagram of an analysis region 600 of a time-of-flight mass spectrometer according to an embodiment of the present invention. In time-of-flight mass-spectroscopy, ions 602 are introduced into an analysis region after being accelerated by a longitudinal acceleration potential $V_x$. The ion velocity after this acceleration depends on the analyte mass. This variation in velocity due to mass diffential leads to a longitudinal sorting of the masses as they propagate through free space. After traveling a distance D, the ions strike a detector 604 on the far side of the analysis region.

The ions produce a time-varying current at the detector that depends on the details of the mass-spectrum. The current can be written as:

$$g(t) \propto \int dm S(m) \delta\left(m - \left(\frac{2qV_x(t-t_0)^2}{D^2}\right)\right),$$

where $t_0$ is the time at which the acceleration potential is turned on.

According to embodiments of the invention, this system may be coded in time by applying a series of acceleration pulses. The current at time t resulting from the $i^{th}$ acceleration pulse is then $$g_i(t) \propto \int dm S(m) \delta\left(m - \left(\frac{2qV_{x,i}(t-t_0)^2}{D^2}\right)\right).$$

The total current at time t is then the sum of the contributions from all of the pulses, and can be written as $$g(t) \propto \sum_i dm S(m) \delta\left(m - \left(\frac{2qV_{x,i}(t-t_0)^2}{D^2}\right)\right).$$

Figure 7:
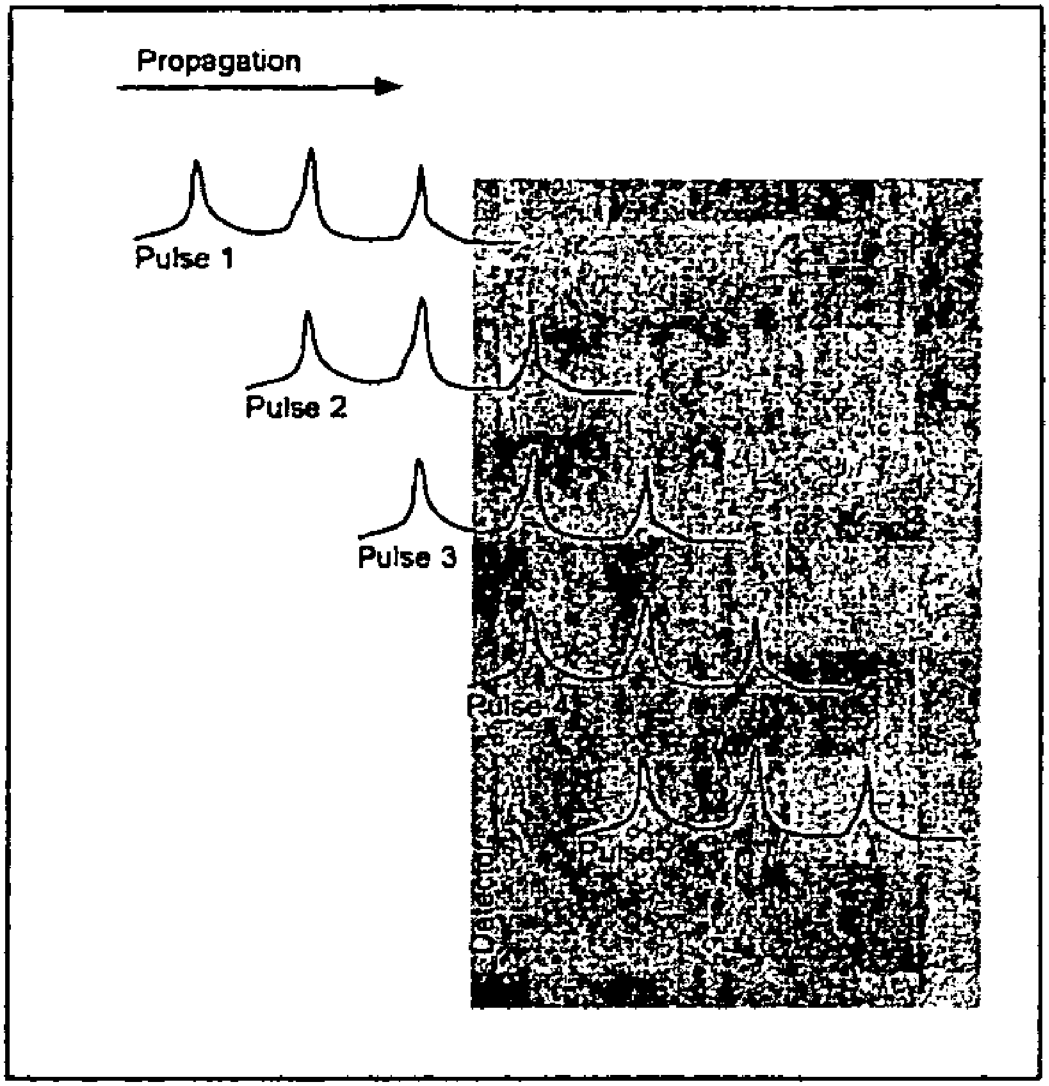
FIG. 7 illustrates several ion pulses traveling toward a detector in a mass spectrometer.

Nominally g(t) consists of a sum of scaled and delayed mass spectra. The challenge of the sensor system is to decode these sums to produce the original spectrum. FIG. 7 illustrates several ion pulses (Pulse 1, Pulse 2, Pulse 3, Pulse 4, and Pulse 5) traveling to the detector. The vertical displacement of the pulses is not physical and is included for clarity only. The detector signal at a time t is given by summing the values of all the pulses in the shaded band. If the presence/absence of a pulse in the $i^{th}$ pulse-slot is coded by the elements of a perfect sequence, the spectrum can be reconstructed from the temporal signal recorded by the detector. In a discrete representation, if $\vec{g}$ is a vector that contains the detected time-series, then:

$$\vec{g} = \overleftrightarrow{G}\vec{g}_i.$$

For the case where $\overleftrightarrow{G}$ is a matrix whose rows are circularly-shifted versions of a perfect sequence, the inverse $\overleftrightarrow{H} = \overleftrightarrow{G}^{-1}$ exists and is well-conditioned. In that case the measurement that would have been obtained from a single ion pulse can be extracted by:

$$\vec{g} = \overleftrightarrow{G}^{-1}\vec{g}_i = \overleftrightarrow{G}^{-1}\overleftrightarrow{G}\vec{g}_i.$$

This vector can then be converted into a mass spectrum using standard analysis techniques of time-of-flight mass-spectroscopy.

Hyperspectral Mass Spectrometer

The following embodiments of the present invention combine the elements of the aperture-coded magnetic-sector and the injection-time-coded time-of-flight mass-spectrometers described above. The result is a higher-dimensional "data-volume" of spectral data. The data-volume contains information on the analyte mass-spectrum as a function of both spatial location and time. A device of this type is useful for analyzing spatio-temporal concentration dynamics of chemical processes. Further, the ability to track the time-rate-of-change of certain analytes (e.g., common explosives) could be very important in security applications.

Figure 8:
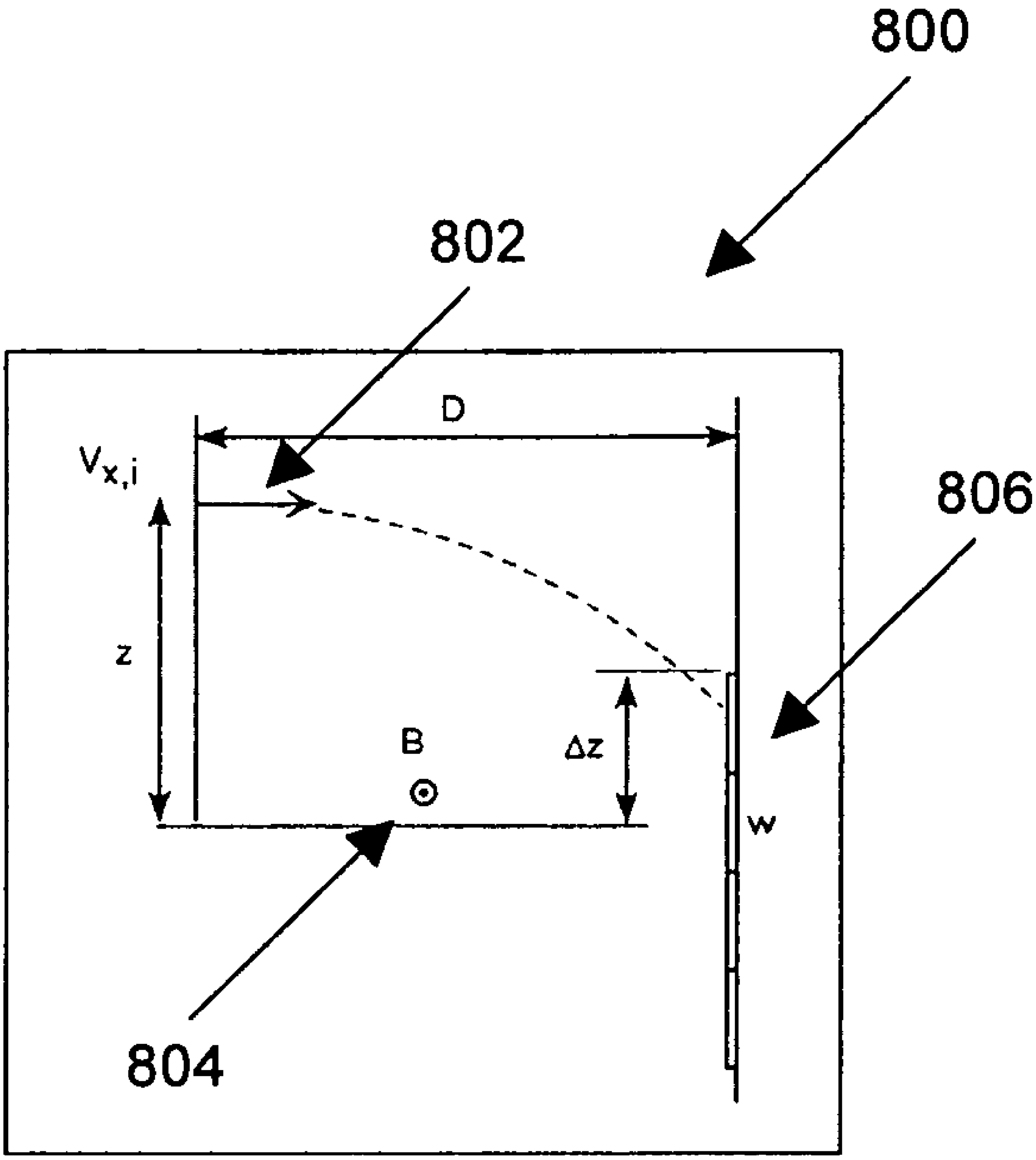
FIG. 8 is a schematic diagram of an analysis region of a coded mass spectrometer combining aperture coding and injection time coding according to an embodiment of the present invention.

FIG. 8 is a schematic diagram of an analysis region 800 for an instrument combining the elements of an aperture coded magnetic sector instrument and an injection-time-coded time-of-flight mass spectrometer. In this design, ions 802 enter analysis region 800. Analysis region 800 contains a transverse magnetic field 804 of magnitude B. After traversing this region, they strike a position sensitive detector 806 on the far wall a distance D away.

For ions entering at a height z above a reference elevation, and for a single pulse of acceleration potential, the contribution to the $i^{th}$ detector location at time t is $$g_i(z,t) \propto \int_{\Delta z-(i+1)w}^{\Delta z-iw} dz' \int dm S(m) \delta\left(m - \left(\frac{qB^2}{8V_{x,i}}\right)\left(\frac{D^2}{(z'-z)^2}\right)\right)\delta\left(m - \sqrt[3]{\frac{q^3B^2V_{x,i}t^4}{2(z'-z)^2}}\right).$$

Considering all possible starting elevations, all acceleration pulses, and adding a transmission function T, we can write the total contribution to the $i^{th}$ detector location as:

$$g_i(t) \propto \sum_j \int dz T(z) \int_{\Delta z-(i+1)w}^{\Delta z-iw} dz' \int dm S(m)$$
$$\delta\left(m - \left(\frac{qB^2}{8V_{x,i}}\right)\left(\frac{D^2}{(z'-z)^2}\right)\right)\delta\left(m - \sqrt[3]{\frac{q^3B^2V_{x,j}(t-t_j)^4}{2(z'-z)^2}}\right).$$

In this scheme the detected signal is a sum of spectra that are stretched both spatially and temporally. For that reason, coding may be provided in both the spatial and temporal domains in these embodiments. The presence/absence of an ion pulse is determined by the elements of a perfect sequence as described above for coded time-of-flight mass-spectroscopy, and the openings in the input aperture are determined by either a perfect sequence or a Hadamard matrix as described above for coded magnetic-sector mass-spectroscopy.

Mass Focused Magnetic-sector Mass-spectrometer

Figure 9:
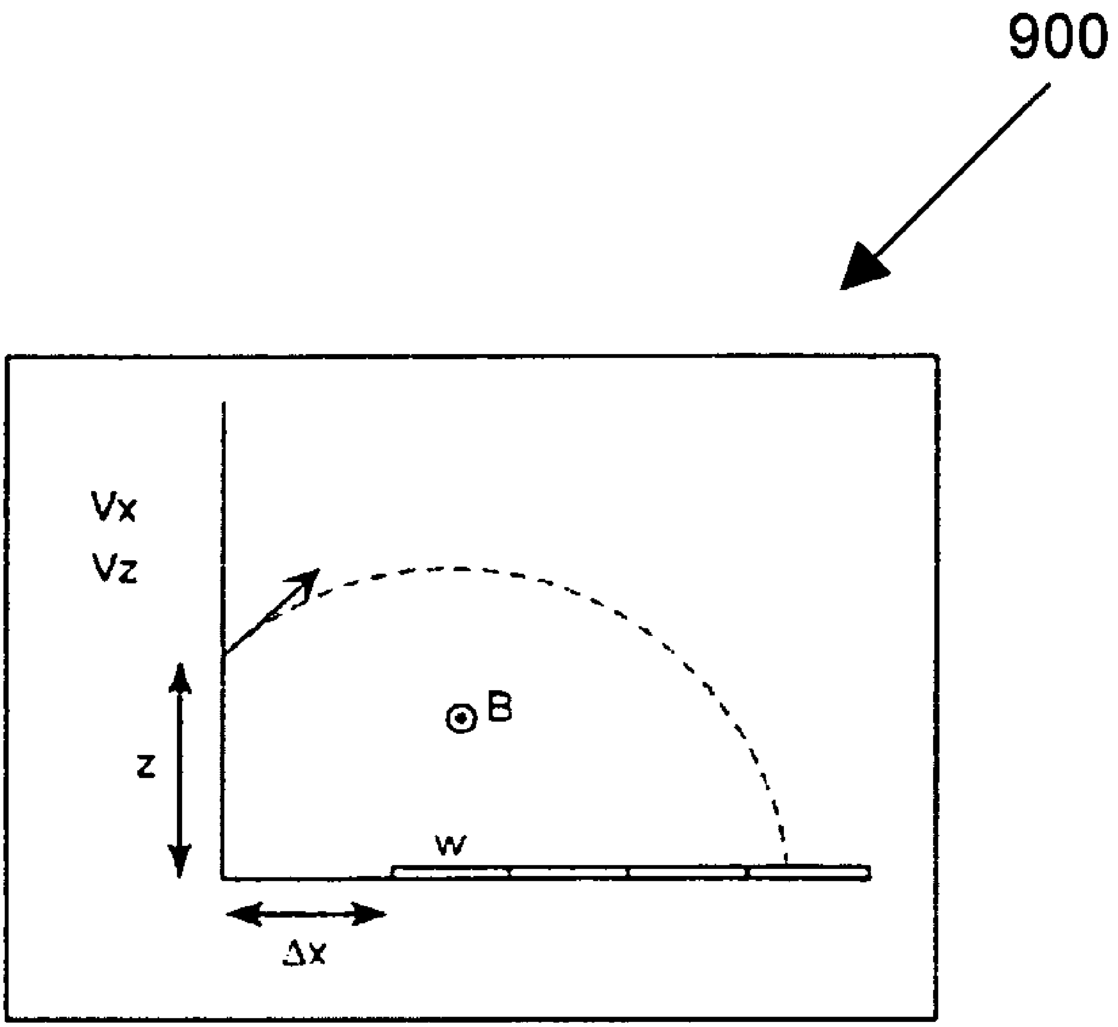
FIG. 9 is a schematic diagram of an analysis region of a coded magnetic sector mass spectrometer according to an embodiment of the present invention.

FIG. 9 is a schematic diagram of an analysis region 900 for a magnetic sector mass spectrometer configured to minimize an ambiguity in the impact location of an ion on the detector. In traditional magnetic-sector mass-spectroscopy, the impact location of the ion onto the detector depends on both the charge-to-mass ratio of the ion and the vertical position of its entrance point into the analysis region. This multivariate dependence is the cause of the resolution/sensitivity dichotomy in a magnetic sector mass spectrometer. It is possible to minimize the ambiguity between the two variables by introducing a transverse acceleration grid that provides transverse kinetic energy to the ion just prior to its entry into the analysis region.

The overall signal at location i in the detector is:

$$g_i = \int dz T(z) \int_{\Delta x+(i-1)w}^{\Delta x+iw} dx \int dm S(m)$$

$$\delta\left(m - \left(\frac{qB^2}{8}\right)\left(\frac{(x^2+z^2)^2}{(V_z x^2 + V_x z^2)} + \frac{2\sqrt{V_x V_z x^2 z^2((x^2+z^2)^4)}}{(V_z x^2 + V_x z^2)^2}\right)\right).$$

This can be seen to reduce to the simpler magnetic-sector result above for the case where $V_x=0$.

With a proper transverse velocity, the impact location of the ions depends primarily on their charge-to-mass ratio and large input apertures are possible without dramatically reducing the resolution of the instrument. Although such an arrangement could produce mass-spectra of reasonable resolution by itself, application of additional coding in the system according to embodiments of the invention would further increase the resolution of the instrument. The coding may take the form of a coded input aperture as in the coded magnetic-sector mass-spectroscopy.

Another combination according to embodiments of the invention is one that combines the focusing effect with an aperture coding that could be turned on or off.

The system could produce a coarse mass-spectrum with the additional coding turned off. Then, if and when higher resolution was needed, the coding could be activated, increasing the resolution of the device. Such a setup would naturally provide a multi-scale view of the input state-a likely prerequisite for compressive sensing. Further, the ability for the sensor to operate with limited capabilities with the coding turned off could have important applications for low-power applications described below.

Ultra-low Power Mass Spectormeter

Figure 10:
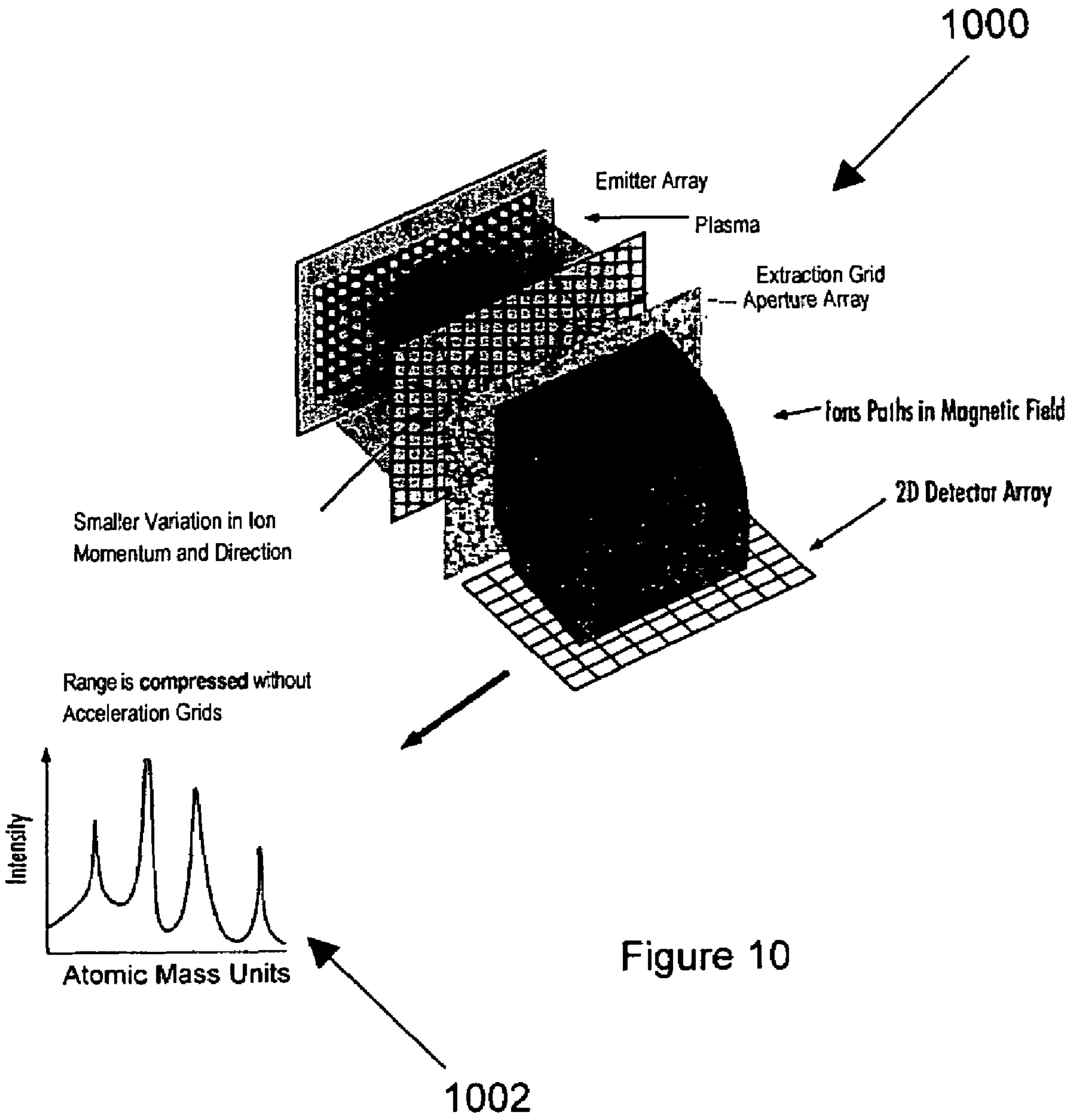
FIG. 10 is a schematic diagram of a coded mass spectrometer using coding in the emitter and extraction grids according to an embodiment of the present invention.

Coding in the emitter and extraction grids according to embodiments of the invention can yield a lower variation in the momentum and direction of the generated ions, allowing the focusing and acceleration grids to be operated at much lower power or omitted altogether. FIG. 10 is a schematic diagram of a mass spectrometer according to an embodiment of the present invention using coding in the emitter and extraction grids. As shown ions in the emitter array plasma formed by ionization of the sample analyte are extracted through the extraction grid aperture array. As describe above, the ions pass through a magnetic field that deflects the ions onto a 2-dimensional detector array according to their masses.

As shown by graph 1002, the embodiment without acceleration grids can result in a compressed spectrum as compared with the embodiment illustrated in FIG. 3. The compressed spectrum is due to the lower energies imparted to the ions due to the absence of the acceleration grids. In addition, resolution may be limited as compared with the embodiment of the present invention illustrated in FIG. 3. However, the embodiment of FIG. 10 can result in detection of larger amu's, and/or lower power consumption.

Alternatively, some designs may allow the coding to be turned off until the system determines that higher resolution is necessary. Such an on-demand system according to embodiments of the invention could have a dramatic impact on the power-requirements of the instrument. This lower power consumption may be highly desirable in many dispersed or portable applications.

Effusion-time-coded Mass Spectrometer

Figure 11A:
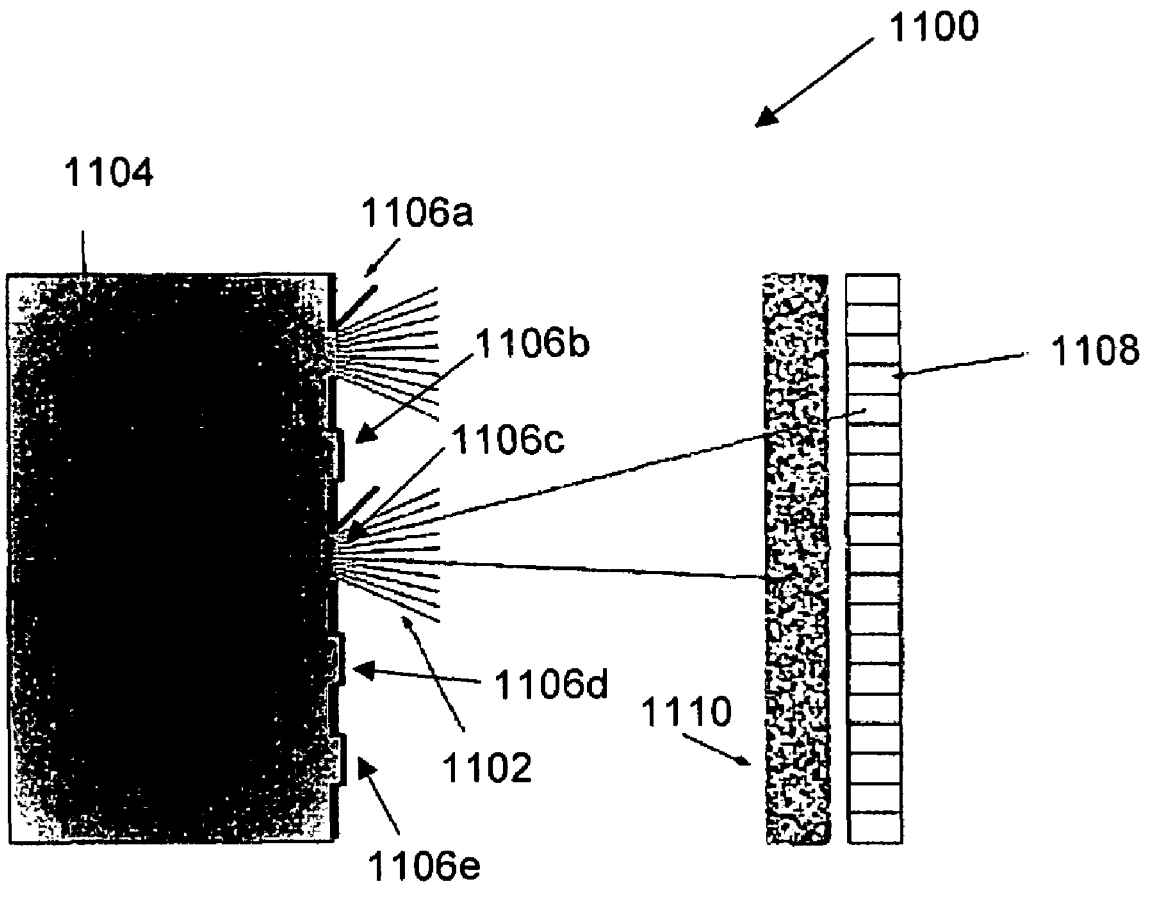
FIGS. 11*a* and 11*b* are schematic diagrams of effusion time coded mass spectrometers according to embodiments of the present invention.

FIG. 11*a* is a schematic diagram of an effusion-time-coded mass spectrometer 1100 according to an embodiment of the present invention. Ions 1102 from a plasma 1104 created during ionization effuse through gas inlets 1106*a-e*. Gas inlets 1106*a-e* are an array of tiny pinholes between high density plasma 1102 and a time of flight detector 1108. A coded aperture 1110 between the effusion of ions 1102 and detector array 1108 provides mass spectrometer coding according to position. The effusion rate is a function of the mass of the ion. Lighter ions effuse more quickly, according to Graham's law:

$$(\text{effusion rate})_A \times (\text{molecular mass})_A^{1/2} = (\text{effusion rate})_B \times (\text{molecular mass})_B^{1/2}$$

Time-domain coding could be added to the arrangement illustrated in FIG. 11 by opening and closing gas inlets 1106*a-e* in a coded manner at a certain frequency, to correct for the quantum efficiency of the detector.

Figure 11B:
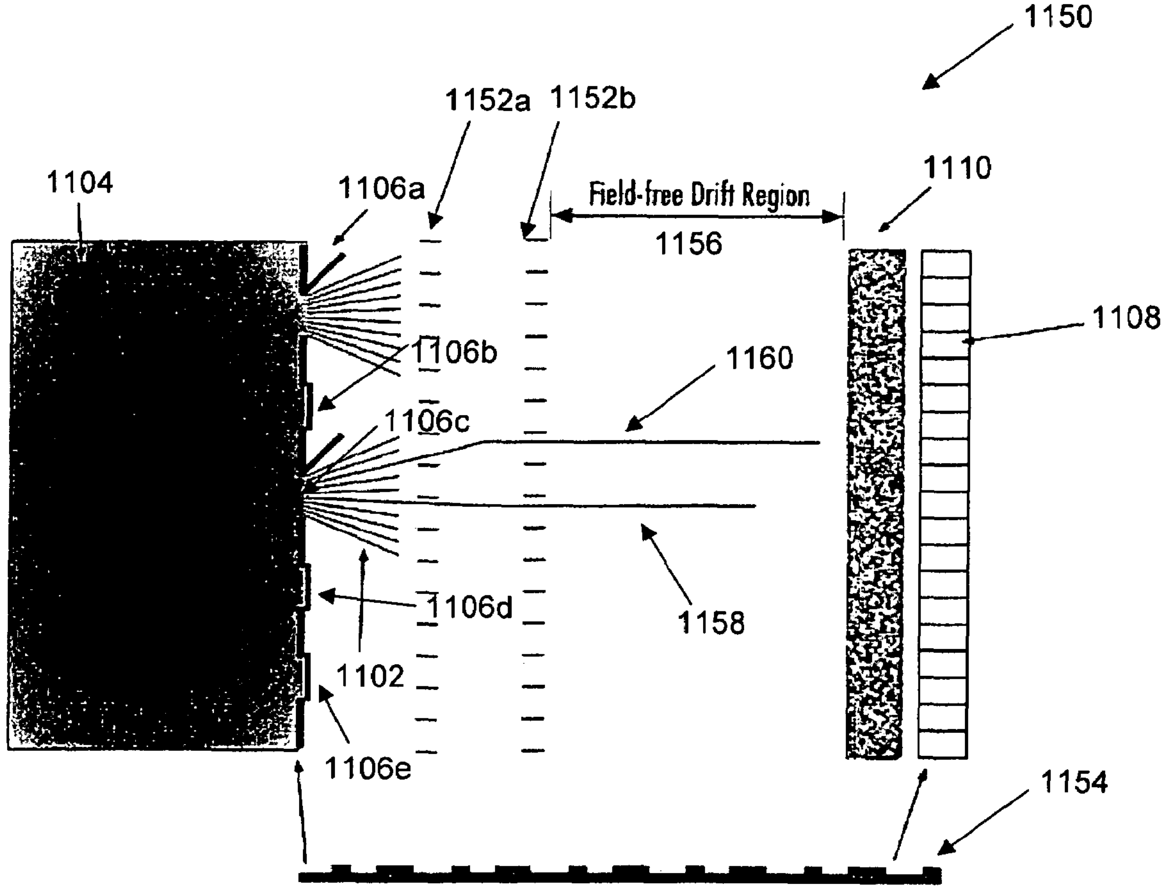

FIG. 11*b* is a schematic diagram of an effusion-time-coded time-of-flight mass spectrometer 1150 according to an embodiment of the present invention. A plasma 1104 containing ions 1102 is created during ionization of a sample, such as a gas analyte. Ions 1102 are effused to gas inlets 1106*a-e*. Gas inlets 1106*a-e* are opened and closed according to a temporal coding sequence, such as shown by creation/collection pulse train 1154. As is typical in time-of-flight mass spectrometers, ions 1102 are accelerated toward a position coded aperture 1110 and a detector 1108 by acceleration grids 1152*a* and 1152*b*. The ions drift toward position coded aperture 1110 through a free drift region 1156. Ions with higher mass-to-charge ratios, such as ion 1158, take longer to reach coded aperture 1110 than ions with lower mass-to-charge ratios, such as ion 1160.

Accelerator grids 1152*a* and 1152*b* may not be necessary in the time-of-flight mass spectrometer illustrated in FIG. 11*b*. This is because a dispersive element separates the ions according to mass/charge ratio and the time-domain coding will separate the ions according to inlet of origin. Consequently, the embodiment of the present invention illustrated in 11*a* may be sufficient for a time-of-flight mass spectrometer according to an embodiment of the present invention as well.

Sample Design for an Aperture-coded Magnetic Sector Mass Spectrometer

Following is an examination of one of the designs described above. Specifically, an exemplary implementation of an aperture-coded magnetic-sector mass spectrometer according to an embodiment of the present invention as well as how it achieves both high-resolution and high sensitivity is discussed below.

A general schematic for the analysis region of a magnetic sector mass spectrometer is provided in FIG. 4. An exemplary magnetic sector mass spectrometer has an ionization region of transverse dimensions 10 mm (y) and 1 mm(z). The longitudinal acceleration grid has a potential difference of 100V, and the magnetic field strength is 0.5 T, and is oriented in the -y direction. The detector is located 1 mm below the ionization region and has a transverse extent that matches the ionization region. Longitudinally, the detector extends from 4-13 mm from the input aperture. The position sensitive detector can distinguish 192 locations in the transverse direction and 500 locations in the longitudinal direction.

Figure 12:
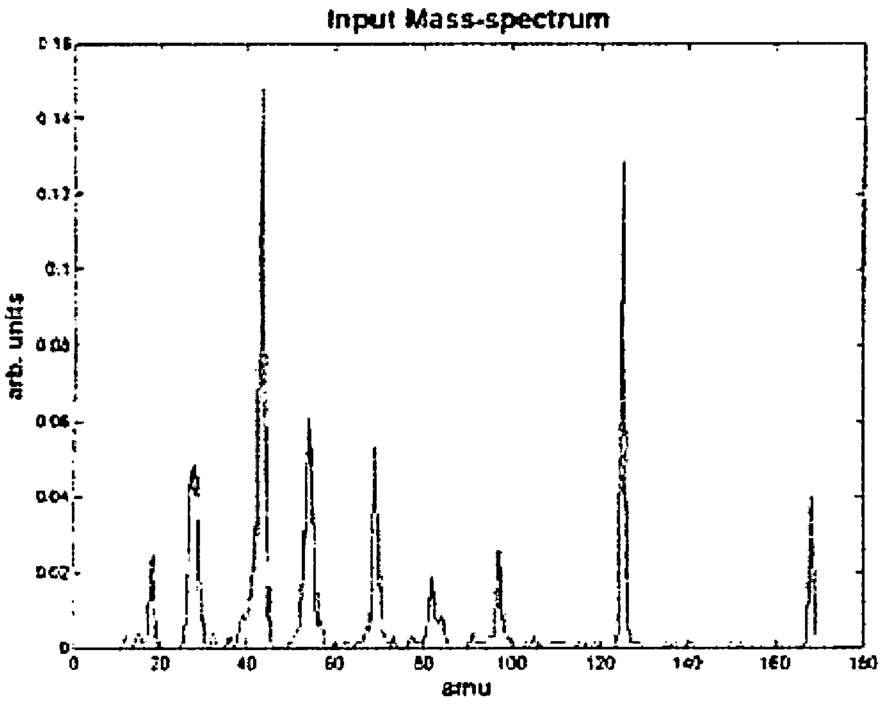
FIG. 12 is a graph of an exemplary input mass spectrum for uric acid.

For comparison purposes, the performance of two different input apertures is simulated as follows: 1) a horizontal slit of height 10.4 microns located at the bottom of the input aperture, and 2) a coded aperture based on the order-96 Hadamard matrix. The slit represents the approach used in conventional instruments, while the coded aperture is an embodiment of the present invention. In each case, the trajectory of $10^6$ ions are simulated and traced through the apparatus to determine their contribution to the signal from the position sensitive detector. The ions are drawn from a probability distribution that accurately reflects the mass-spectrum of uric acid, and therefore represents an accurate simulation on how the various designs would fare in detecting this particular compound. FIG. 12 is a graph 1200 of an exemplary input mass spectrum for uric acid.

Figure 13:
FIG. 13 is a schematic diagram of an exemplary input aperture mask used for position coding according to an embodiment of the present invention.

FIG. 13 is a schematic of the exemplary input aperture mask used for position coding in the present example. The white regions of aperture mask 1300 indicate areas that are transmissive to ions. The black regions of aperture mask 1300 indicate areas that block the ions.

Figure 14:
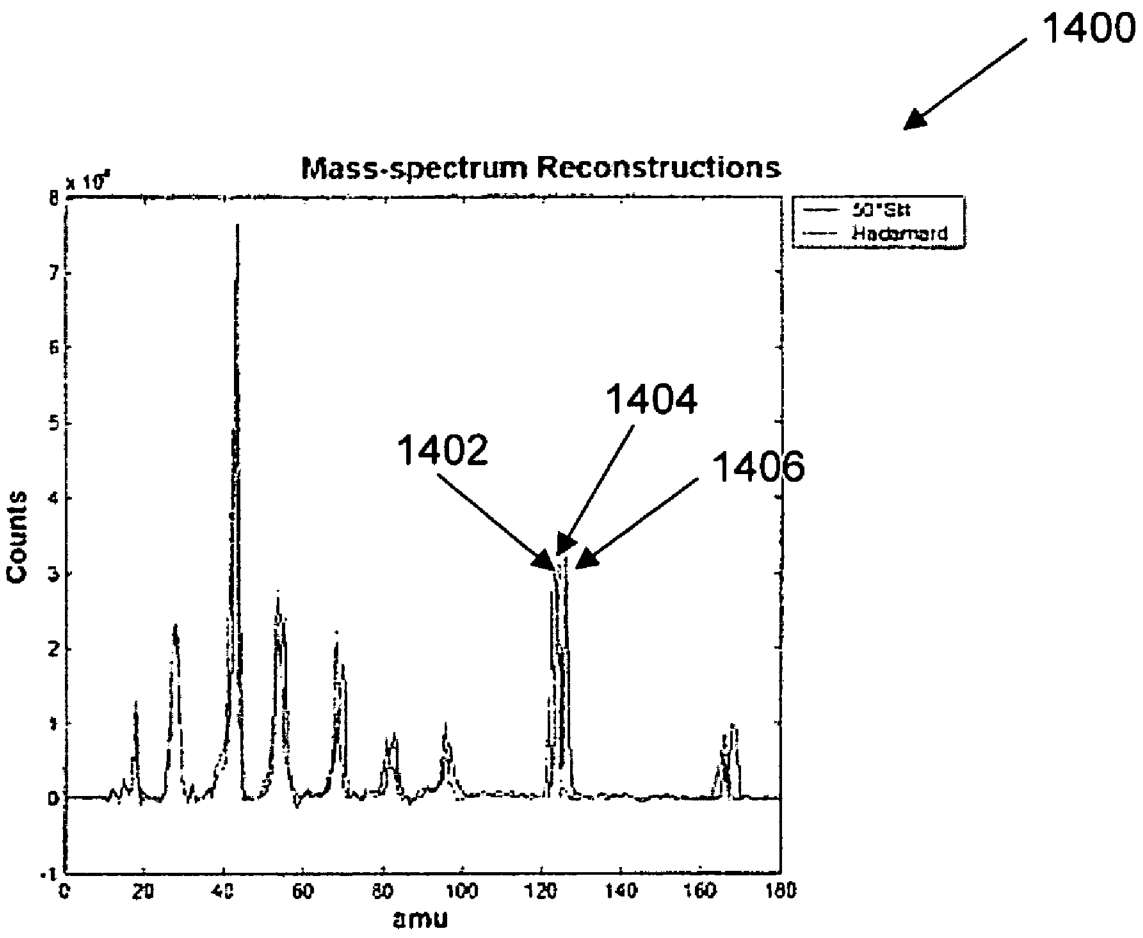
FIG. 14 is a graph comparing the reconstructed spectra for a mass spectrometer using a slit aperture and a mass spectrometer using a coded aperture.

FIG. 14 is a graph 1400 comparing the reconstructed spectrum for the slit aperture 1402 and the spectrum for the coded aperture 1404 with the input spectrum 1406. The signal from the slit has been numerically multiplied by a factor of 50 to make it comparable to the signal from the coded mask-indicating that the coded aperture achieves a throughput advantage of 50 as expected. The correspondence between the two reconstructions and the input spectrum is quite good. Both reconstructions show some deviation from the input spectrum, most notably at high-amus. These deviations arise from the discrete nature of the position sensitive detector and can be corrected by software.

Embodiments according to the invention include the application of coding to any sensor that is based on particle separation, where the particle has a finite mass and the separation is accomplished in the spatial domain and/or in the time domain.

Embodiments of the present invention have been described with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the fouls of a computer program product on a computer-usable or computer-readable storage medium having computer-usable or computer-readable program code embodied in the medium for use by or in connection with an instruction execution system.

In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used to describe embodiments of the present invention, the term "coupled" encompasses a direct connection, an indirect connection, or a combination thereof. Two devices that are coupled can engage in direct communications, in indirect communications, or a combination thereof. Moreover, two devices that are coupled need not be in continuous communication, but can be in communication typically, periodically, intermittently, sporadically, occasionally, and so on. Further, the term "communication" is not limited to direct communication, but also includes indirect communication.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered examples appended hereto, and by their equivalents.

What is claimed is:

1. A coded mass spectrometer, comprising:

an ion source to generate ions from a sample;

a detector to detect a plurality of mass-to-charge ratios associated with the ions;

one or more grids located between the ion source and the detector, that cause the ions to travel toward the detector, and that reduce a variation of momentum and direction attributable to the ions; and a code applied by one or more of the ion source, the one or more grids, and the detector and represented mathematically by a transformation matrix comprising at least one off-diagonal element, wherein a mass spectrum of the ions is calculated from the plurality of mass-to-charge ratios and the transformation matrix.

2. The coded mass spectrometer of claim 1, wherein the code is a spatial code.

3. The coded mass spectrometer of claim 1, wherein the code is a temporal code.

4. The coded mass spectrometer of claim 1, wherein the coded mass spectrometer is a magnetic sector mass spectrometer having a magnetic field that affects the travel of the ions.

5. The coded mass spectrometer of claim 1, wherein the coded mass spectrometer is a time-of-flight mass spectrometer.

6. The coded mass spectrometer of claim 1, wherein the code is provided by injections of ions according to a time code.

7. The coded mass spectrometer of claim 1, wherein the ion source comprises an emitter, and the code is supplied by the emitter to lower variation in a momentum and a direction of the ions.

8. The coded mass spectrometer of claim 1, wherein the code comprises a Hadamard code.

9. The coded mass spectrometer of claim 1, wherein the code comprises a Walsh code.

10. The coded mass spectrometer of claim 1, wherein the code comprises a perfect coding sequence.

11. A coded mass spectrometer, comprising:

an ion source to generate ions from a sample;

a coded aperture;

one or more grids located between the ion source and the coded aperture, that cause the ions to travel toward the coded aperture, and that reduce a variation of momentum and direction attributable to the ions;

a detector that receives the ions from the coded aperture and detects a plurality of mass-to-charge ratios associated with the ions; and a code applied by the coded aperture and represented mathematically by a transformation matrix comprising at least one off-diagonal element, wherein a mass spectrum of the ions is calculated from the plurality of mass-to-charge ratios and the transformation matrix.

12. A method of estimating a mass spectrum of a sample using a coded mass spectrometer, comprising:

generating ions from the sample using an ion source;

causing the ions to travel toward a detector and reducing a variation of momentum and direction attributable to the ions using one or more grids;

applying a code to the ions that is represented mathematically by a transformation matrix comprising at least one off-diagonal element;

detecting a plurality of mass-to-charge ratios associated with the ions using the detector; and calculating the mass spectrum from the plurality of mass-to-charge ratios and the transformation matrix.

13. The method of claim 12, wherein the code is a spatial code.

14. The method of claim 12, wherein the code is a temporal code.

15. The method of claim 12, wherein the coded mass spectrometer is a time-of-flight mass spectrometer.

16. The method of claim 12, wherein the code is applied to the ions using the ion source.

17. The method of claim 12, wherein the code is applied to the ions using the one or more grids.

18. The method of claim 12, wherein the code is applied to the ions using the detector.

19. The method of claim 12, wherein the code is applied to the ions using a coded aperture.

20. The method of claim 12, wherein a number of elements in the mass spectrum is greater than the plurality of mass-to-charge ratios detected.

* * * * *